UNITED STATES PATENT OFFICE.

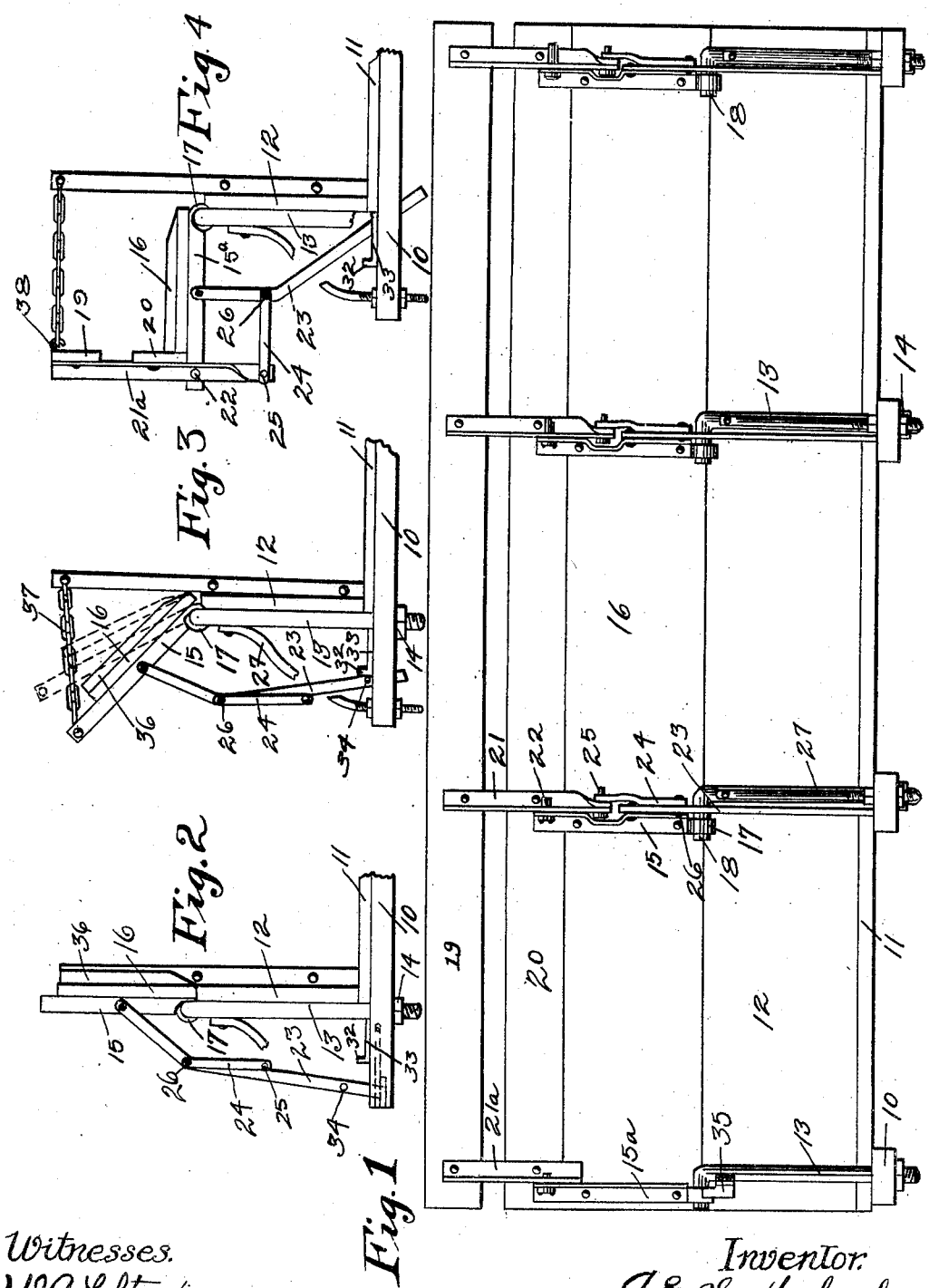

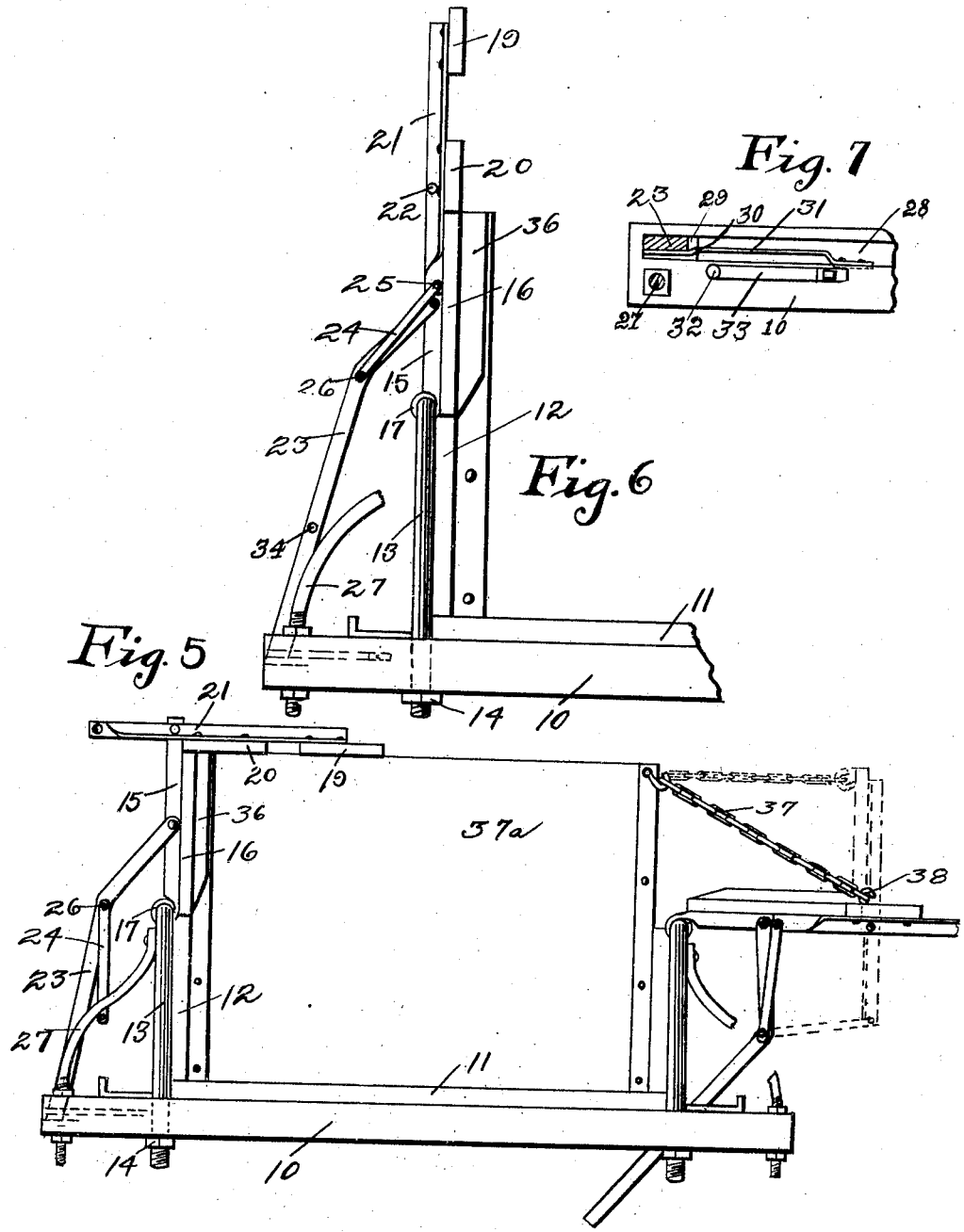

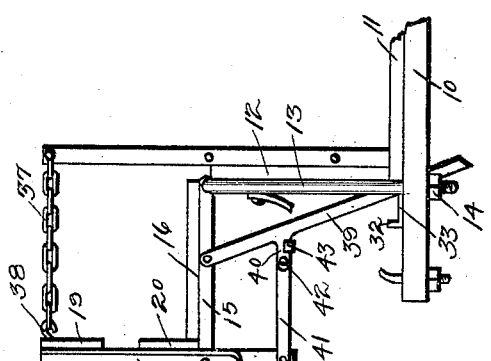
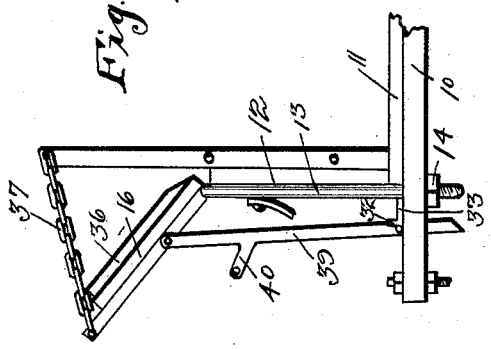
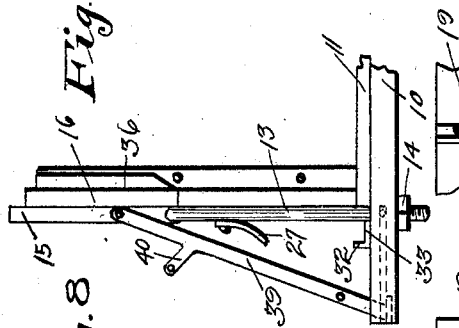
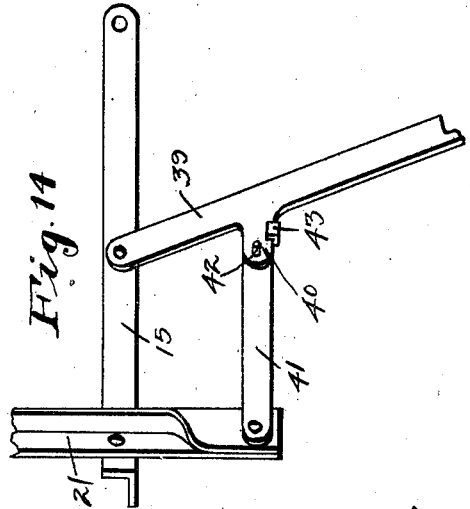
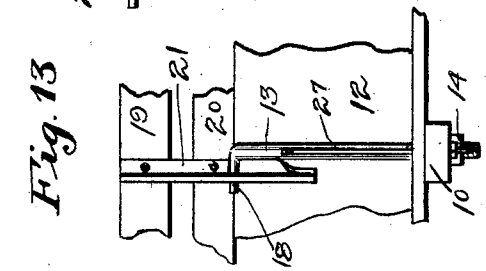
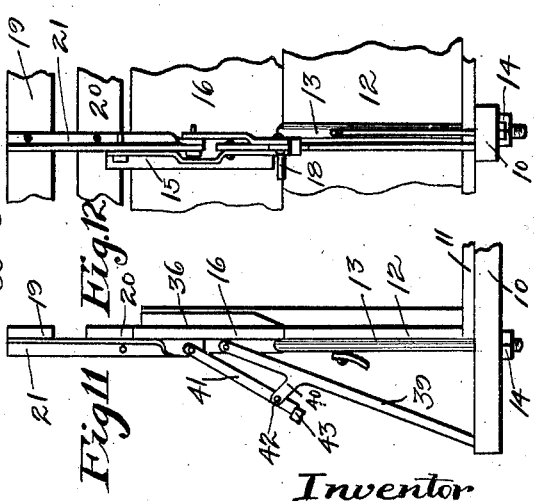

ANDREW E. SUTHERLAND, OF MADRID, IOWA.

ADJUSTABLE WAGON-RACK.

976,614.　　　　　Specification of Letters Patent.　　Patented Nov. 22, 1910.

Application filed July 21, 1909. Serial No. 508,858.

*To all whom it may concern:*

Be it known that I, ANDREW E. SUTHERLAND, a citizen of the United States, residing at Madrid, in the county of Boone and State of Iowa, have invented a certain new and useful Adjustable Wagon-Rack, of which the following is a specification.

The object of my invention is to provide an adjustable wagon rack, simple, durable, and inexpensive in construction, designed for different uses other than that of the common form of wagon box.

A further object of my invention is to provide an adjustable wagon rack in which the side-boards may be quickly and easily interchanged, removed or replaced.

A further object of my invention is to provide an adjustable wagon rack in which the adjustments may be quickly and easily made, and in which the adjustable rack members are rigidly supported relative to the stationary rack members.

My invention consists in the construction, arrangement, and combination of the various parts of the device, whereby the objects contemplated are attained, as hereinafter more fully set forth, pointed out in my claims, and illustrated in the accompanying drawings, in which—

Figure 1 shows a side elevation of the adjustable wagon rack. Fig. 2 shows a detail end view of the rack with the upper side-board removed. Fig. 3 shows a detail end view of the rack with the middle side-board slightly tilted and braced. Fig. 4 shows a detail end view of the rack with the side-boards in position forming a hay rack. Fig. 5 shows an end view of the wagon rack, with the side-boards on one side forming a hay rack, and on the other side forming an inclosed wagon rack. Fig. 6 shows a detail end view of the rack. Fig. 7 shows a detail view of the locking device for securing the adjustable side-board supports. Fig. 8 shows a detail end view of the modified form of rack with the upper side-board removed. Fig. 9 shows a detail end view of the modified form of rack with the second board tilted and braced. Fig. 10 shows a detail end view of the modified form of rack with the side-boards in position forming a hay rack. Fig. 11 shows a detail end view of the modified form of rack. Fig. 12 shows a side view of same. Fig. 13 shows a detail view of the modified form of rack with the third side-board fixed to the bottom one, and Fig. 14 shows a detail view of the modified side-board supports.

Referring to the accompanying drawings, I have used the reference numeral 10 to indicate the cross pieces which support the floor 11. The bottom side-boards 12 are supported in an upright position by the supports 13, which are fixed to said cross pieces 10 by the nuts 14. The angle irons 15 and 15ª are fixed to the middle side-boards 16. Loops 17 on the lower ends of said angle irons 15 and 15ª are arranged to engage the ends 18 of the supports 13, which are bent in a horizontal position at the top. The top side-board members 19 and 20 are fixed together by the angle irons 21 and 21ª. The top side-board is pivoted to the middle side-board by means of the pins 22, which are inserted in alinement through the angle irons 15ª and 21ª, and 15 and 21, the pin connecting the angle iron at the front end of the rack being of minimum length, the pin connecting the angle iron at the rear end of the rack being of maximum length and the other pins being of graduated lengths between the two first mentioned so that in adjusting the side boards the longest pin will engage the angle irons first, then the next longest pin, and so on throughout the set.

The supports 23 are pivoted to the angle irons 15 at their upper ends, and extend downwardly into the slots in the cross pieces 10, said slots being more fully hereinafter described. The links 24 are pivoted at one end to the lower ends of the angle irons 21 by the detachable pins 25, and at the other end to the supports 23 by the pins 26. The brace rods 27 hold the supports 13 in an upright position. The lower ends of the supports 23 engage the slots 28 in the cross pieces 10. The plates 29 at the bottom of said slots 28 are arranged to support the supporting arms 23 when said supports are in their extended positions, as shown in Figs. 2, 5, 6, and 7. Shoulders 30 on the spring bars 31, which are fixed to the cross pieces 10, engage the supports 23 and hold them in their extended positions. The upwardly extended portions 32 of the rods 33 which are fixed to the cross pieces 10 are designed to engage the pins 34 extending through the supports 23, when said supports are in positions shown in Fig. 3. The lug 35 fixed to the forward upright support 13 is arranged to engage the angle irons, when the side boards 16 are in position below that shown by dotted lines in Fig. 3.

The strips 36 fixed to the forward ends of the side-boards 16 are arranged to engage the rear side of the front end gate when the side board 16 is in position above that shown by dotted lines in Fig. 3. The chains 37 are fixed at one end to the front end gate 37ª and are designed to engage, at the other end, the hooks 38 on the top side-board when said side-board is in any of its different positions.

In the modified form of my invention, as shown in Figs. 8 to 14, inclusive, the reference numeral 39 indicates the straight side-board supports with the outwardly extended lugs 40. The links 41 are pivotally connected to the angle irons 21 at one end, and are pivoted to the outwardly extended lugs 40 by the pins 42, said pins being fixed to the links 41. On the inner end of the links 41, the lugs 43 extend downwardly, then outwardly and upwardly in such a way as to engage the side of the lug 40, such an arrangement allowing the pin 42 to be removed from the lug 40 only when the links 41 are in an upright position. The ends 18 on the supports 13 are designed to enter the holes in the angle irons 21, in which the pins 22 normally rest. The side-board members on the upper side-board are arranged to rest on the side-boards 12 when the second side-boards 16 are removed. The chains 37 and hooks 38 are arranged as hereinbefore described.

In the practical use of the wagon rack, any or all of the side-boards may be used. If but two side-boards are required, the top board may be removed by removing the pins 22 and 25 from the angle irons and links. If only the bottom side-board is to be used, the side-board 16 may be removed by first lifting the supports 23 from the slots 28, then placing said side-board 16 in the position as shown in dotted lines in Fig. 3, thus releasing the lug 35 from engagement with the angle iron 15ª, and also releasing the piece 36 from engagement with the front end gate 37. The side-boards 16 may then be removed by sliding them forwardly until the loops 17 disengage the supports 13. By changing the positions of the supports 23 and the length of the chains 37, the middle and top boards may be placed in position forming a common wagon box, a coal wagon, or different forms of a hay rack.

I claim as my invention.

1. An adjustable wagon rack, comprising a floor, cross pieces under the floor, upright supports extending upwardly and forwardly fixed to the cross pieces, side boards fixed to the supports and to the floor, angle irons pivoted to the upright supports, side boards fixed to the angle irons, adjustable side board supports pivotally connected to said angle irons, means for connecting said side board supports to the ends of said cross pieces, a second set of angle irons, a set of pins pivotally connecting said second set of angle irons to the first mentioned set of angle irons, the pin connecting the angle irons at the front end of the rack being of minimum length, the pin connecting the angle irons at the back end of the rack being of maximum length, and the others being of graduated lengths between the two first mentioned so that in adjusting the side boards, the longest pin will engage with the angle iron first, then the next longest pin will be engaged and so on throughout the set, side boards fixed to the second set of angle irons, adjustable side board supports pivotally connected to the first mentioned set of angle irons, side board supporting links connecting said supports to the second set of angle irons, and side board supporting chains for adjusting the side boards on the second set of angle irons.

2. An adjustable wagon rack, comprising a floor, cross pieces under the floor having slots in the ends thereof, supports extending upwardly and forwardly fixed to the cross pieces, side boards fixed to the supports, angle irons pivotally and slidingly connected to the forwardly extended ends of the supports, side boards fixed to said angle irons, a second series of angle irons pivotally connected to the aforesaid angle irons, side boards fixed to said second series of angle irons, side board supports pivotally connected at their upper ends to the first mentioned series of angle irons, and extending through the slots in the ends of said cross pieces, spring bars in said slots to engage said pivoted supports, plates in the slots to support the pivoted supports, lugs extending through the supports near the bottom ends, rods fixed to the cross pieces extending outwardly and upwardly to engage said lugs, links pivotally connected to the supports at one end, and to the second series of angle irons at the other end, chains fixed to the forward end gate, and hooks on the side boards to engage said chains, for the purposes stated.

3. An adjustable wagon rack, comprising a floor, cross pieces under the floor, supports extending upwardly and forwardly fixed to the cross pieces, side-boards fixed to the supports, angle irons pivotally and slidingly connected to the forwardly extended ends of the supports, side-boards fixed to said angle irons, a second series of angle irons pivotally connected to said angle irons, side-boards fixed to said second series of angle irons, straight side-board supports pivoted at their upper ends to the first series of angle irons, lugs extending outwardly and upwardly from said supports, slots in the ends of the cross pieces under the floor, spring bars in the slots to engage the pivoted supports, plates in the slots to support the pivoted supports, lugs extending through the supports near the bottom ends, rods fixed to the cross pieces extending outwardly and upwardly to engage said lugs, links pivotally connected to the supports at one end and to the second series of angle irons at the other, for the purposes stated, chains fixed to the forward end gate, and hooks on the sideboards to engage said chains.

4. An adjustable wagon rack, comprising a floor, cross pieces under the floor, supports extending upwardly and forwardly fixed to the cross pieces, side-boards fixed to the supports, angle irons pivotally and slidingly connected to the forwardly extended ends of the supports, side-boards fixed to said angle irons, a second series of angle irons pivotally connected to said angle irons, side-boards fixed to said second series of angle irons, straight side-board supports pivoted at their upper ends to the first series of angle irons, lugs extending outwardly and upwardly from said supports, slots in the ends of the cross pieces under the floor, spring bars in the slots to engage the pivoted supports, plates in the slots to support the pivoted supports, lugs extending through the supports near the bottom ends, rods fixed to the cross pieces extending outwardly and upwardly to engage said lugs, links pivotally connected to said supports at one end, pins fixed to said links at the other end, said pins pivotally connecting the links to one side of the lugs on the pivoted side-board supports, lugs on the inner ends of the links to engage the other side of the outwardly extended lugs on the side-boards supports, and to keep said pins and lugs pivotally connected, chains fixed to the forward end-gate, and hooks on the side-boards to engage said chains.

Des Moines, Iowa, July 7, 1909.

ANDREW E. SUTHERLAND.

Witnesses:
G. C. CARLSON,
C. E. ANDERSON.